US012717632B2

(12) United States Patent
Patodia

(10) Patent No.: US 12,717,632 B2
(45) Date of Patent: Aug. 25, 2026

(54) DYNAMIC PROCESSING OF TRANSACTIONS BASED ON PREDICTED COMPUTATION COSTS

(71) Applicant: PAYPAL, INC., San Jose, CA (US)

(72) Inventor: Prabin Patodia, Bangalore (IN)

(73) Assignee: PayPal, Inc., San Jose, CA (US)

( * ) Notice: Subject to any disclaimer, the term of this patent is extended or adjusted under 35 U.S.C. 154(b) by 413 days.

(21) Appl. No.: 18/357,549

(22) Filed: Jul. 24, 2023

(65) Prior Publication Data

US 2024/0411600 A1 Dec. 12, 2024

(30) Foreign Application Priority Data

Jun. 10, 2023 (IN) ............................ 202341039844

(51) Int. Cl.
*G06F 9/50* (2006.01)
*G06F 9/48* (2006.01)

(52) U.S. Cl.
CPC .............. *G06F 9/5027* (2013.01); *G06F 9/48* (2013.01); *G06F 9/4881* (2013.01); *G06F 9/50* (2013.01); *G06F 9/5005* (2013.01); *G06F 9/505* (2013.01); *G06F 9/5072* (2013.01); *G06F 9/5077* (2013.01)

(58) Field of Classification Search
CPC . G06F 9/48; G06F 9/4881; G06F 9/50; G06F 9/5005; G06F 9/5027; G06F 9/505; G06F 9/5072; G06F 9/5077; G06Q 20/10; G06Q 20/401; G06N 20/00
See application file for complete search history.

(56) References Cited

U.S. PATENT DOCUMENTS

2008/0221941 A1* 9/2008 Cherkasova ........ G06F 11/3409 718/105
2014/0129424 A1* 5/2014 Murphy ............. G06Q 30/0283 705/39
2021/0406896 A1* 12/2021 Chaturvedi .......... G06Q 20/405
2024/0273462 A1* 8/2024 Mohammed ......... G06Q 10/087

OTHER PUBLICATIONS

Wang et al, "iBatch: Saving Ethereum Fees via Secure and Cost-Effective Batching of Smart-Contract Invocations", ESEC/FSE '21, Aug. 23-28, 2021, Athens, Greece, ACM, pp. 566-577 (Year: 2021).*

* cited by examiner

*Primary Examiner* — Charles M Swift
(74) *Attorney, Agent, or Firm* — Haynes and Boone, LLP

(57) ABSTRACT

Methods and systems are presented for providing a framework for dynamically managing computer resources in processing transactions by selectively applying one or more techniques to improve the computer resource usage efficiency of processing different transactions. When a request for processing a first transaction is received, an estimated frequency of future transactions that are related to the first transaction is predicted. Based on the estimated frequency of future transactions, one or more actions that improves the computer resource usage efficiency for processing the first transaction are applied. The action may include suspending the processing of the first transaction and subsequently performing a batch process including the first transaction and a second transaction related to the first transaction. The action may include storing data associated with the processing of the first transaction in a cache memory for use in the subsequent processing of a second transaction.

20 Claims, 5 Drawing Sheets

DYNAMIC PROCESSING OF TRANSACTIONS BASED ON PREDICTED COMPUTATION COSTS

CROSS REFERENCE TO RELATED APPLICATION

The present invention claims priority to India Provisional Patent Application Serial No. 202341039844, filed Jun. 10, 2023, which is incorporated herein by reference in its entirety.

BACKGROUND

The present specification generally relates to management of computer resources, and more specifically, to providing a framework for dynamically improving computer resource usage efficiency in processing different transactions according to various embodiments of the disclosure.

Related Art

Advancements in mobile computing have enabled users to conduct transactions (e.g., accessing electronic services, exchanging data, conducting electronic payment transactions, etc.) with other devices more conveniently. For example, with smaller and more powerful user devices (e.g., smart phones, smart watches, smart glasses, etc.), and the increasing availability of connected devices, users now can conduct transactions with many different types of devices, such as merchant devices, other user devices, smart appliances, smart vehicles, etc. anytime and anywhere.

As users are conducting transactions more frequently, an increasing number of transactions are conducted on a smaller scale than in the past (e.g., accessing a smaller amount of data, conducting a fund transfer in smaller amounts, etc.). The increased frequency of small-scaled transactions has put a larger amount of stress on the service provider systems configured to facilitate transactions for users. For example, additional computer resources are required for the service provider systems to handle the increased volume and frequency of transactions. In addition, the ease of conducting transactions has led to an increasing number of fraudulent activities. As such, the service provider systems are now required to implement additional processes (e.g., enhanced authentication services, data encryption and/or security services, etc.) to process the transactions. As a result, the computer systems of the service providers are often overwhelmed with processing the small-scaled transactions, which could impact the overall availability service quality of the computer systems. Thus, there is a need for providing a framework for improving computer resource usage efficiency for processing transactions.

Figure 1:
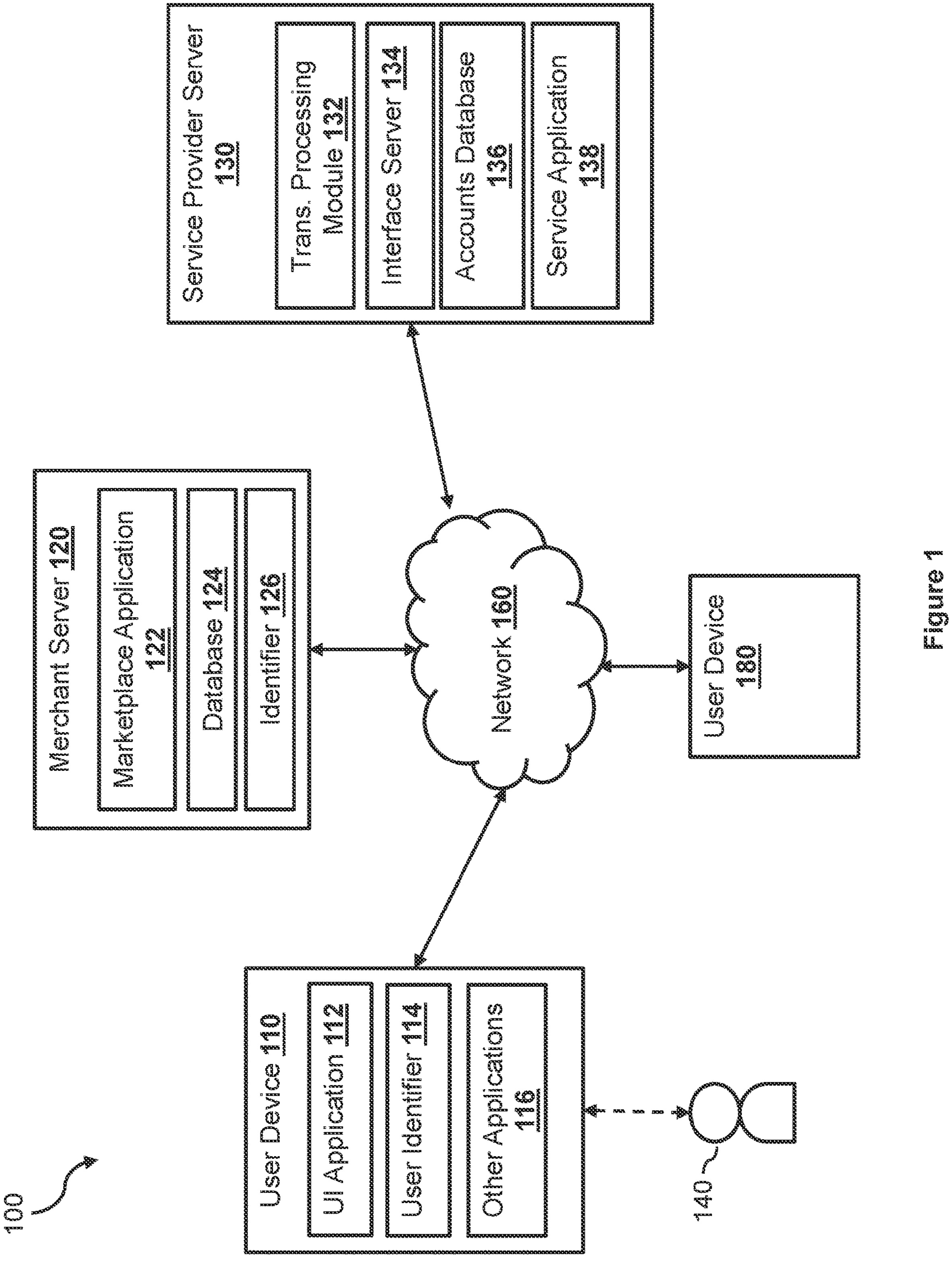
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a framework that dynamically manages computer resources in processing transactions by selectively applying one or more techniques to improve the computer resource usage efficiency of processing transactions. As discussed herein, the increased frequency of transactions and the increased need to provide advanced security for processing the transactions have created a huge burden on computer resources for service provider systems to process the transactions. For example, the computer resources that are required to process a transaction between two entities may include the resources for hosting one or more computer applications that are configured to process the transaction, the resources for hosting data used by the one or more computer applications for processing the transaction, the computer processing capacity used by service provider system for executing the one or more computer applications for processing the transaction, the computer memory that is allocated to the one or more computer applications for processing the transaction, the amount of data that is transmitted across a network for processing the transaction, etc.

When the volume and/or the frequency of the transactions have exceeded a threshold, additional computer hardware infrastructure may be required to ensure that the transactions are processed in a timely manner (e.g., within a required time threshold, etc.), while still ensuring properly processing the transactions (e.g., not approving a fraudulent transaction). Furthermore, in order to combat the increasing amount of fraudulent activity, additional security processes (e.g., advanced authentication processes such as by using one or more machine learning models for assessing risks associated with the transactions, advanced encryption or other data security processes, etc.) may be performed by the one or more computer applications for processing the transaction. Some of the resources, such as the resources to host the computer applications and the data, can be considered fixed costs, which are amortized over the total number of transactions processed by the service provider system. However, some other resources, such as the resources (e.g., processing capacity, memory usage, network bandwidth, etc.) for the computer applications to process the transactions, are considered marginal cost, which is spent by the service provider system for processing each additional transaction. As more transactions are conducted on a smaller scale (e.g., a less crucial transaction, accessing a smaller amount of data, performing a fund transfer in a smaller amount, etc.), the marginal costs that are required by the service provider system to process the smaller transactions may become overwhelming, and may hinder (e.g., increase processing time and/or decrease security measures) the capability of the service provider system in processing transactions that are on a larger scale (e.g., a more crucial transaction, accessing a larger amount of data, performing a fund transfer in a larger amount, etc.).

As such, according to various embodiments of the disclosure, the service provider system may use a framework for dynamically managing computation resources in processing transactions. Specifically, when processing a transaction using the framework, the service provider system may selectively apply one or more techniques that would improve the computation resource usage efficiency in processing the transaction. For example, the service provider system may use different efficiency improvement techniques to process different transactions, based on the characteristics of the transactions and/or the characteristics of other transactions processed or to be processed by the service provider system.

In some embodiments, the service provider system may dynamically select different computer-based models for processing different transactions based on attributes associated with the transactions. As discussed herein, the service provider system may use a variety of models (e.g., machine learning models, decision trees, regression models, etc.) for processing transactions. The models may be configured to assist the service provider system in processing the transactions. For example, the service provider system may use one or more models for authenticating a user associated with the transaction, one or more models for assessing a risk associated with the transaction, one or more models for recommending a funding instrument to be used in the transaction, and/or other models for performing tasks related to the processing of the transaction. It has been contemplated that different models may require different amounts of computer resources, even if they are configured to perform a similar task.

For example, due to the complexity of machine learning models, a model that is implemented as a machine learning model typical requires more computer resources than a different type of model (e.g., a decision tree, etc.). In another example, a model configured to ingest a larger amount of input data (e.g., transactions previously conducted by a user for the last ten years, etc.) typically requires more computer resources than another model that is configured to ingest a smaller amount of input data (e.g., transactions previously conducted by a user for the last month, etc.). In yet another example, a model configured to ingest external data from one or more external sources (e.g., credit data from a credit bureau server, company data from an entity investigation server, etc.) would typically require more computer resources than a model that uses only internal data.

In some embodiments, the service provider system may analyze each of the models available for use in processing transactions. For example, the service provider system may use each of the models to perform a corresponding task (e.g., authenticating a user, assessing a risk, etc.) based on data associated with one or more transactions (e.g., an arbitrary transaction, a previously processed transaction, etc.), and may monitor a computer resource usage by the model (e.g., a time required for the model to perform the task). Based on the analysis, the service provider system may estimate an amount of computer resources required by each model for performing the corresponding task in the processing of a transaction. The service provider system may then assign the models into different tiers (e.g., a basic tier, a medium tier, and a heavy tier, etc.) based on the required amounts of computer resources. For example, the service provider system may assign models having corresponding required amounts of computer resources below a first threshold to a first tier (e.g., the basic tier), models having corresponding required amounts of computer resources above the first threshold but below a second threshold to a second tier (e.g., the medium tier), and models having corresponding required amounts of computer resources above the second threshold to a third tier (e.g., the heavy tier). More tiers may be used as appropriate.

Upon receiving a request to process a transaction, the service provider system may dynamically select one or more of the tiers of models for processing the transaction based on attributes associated with the transaction. For example, the service provider system may select the tier of models for processing the transaction based on the scale of the transaction, such that when the transaction is on a larger scale (e.g., involving a larger amount, such as exceeding an amount threshold, accessing a larger amount of data, etc.), a higher tier of models (e.g., the heavy tier) may be used for processing the transaction, and when the transaction is on a smaller scale (e.g., involving a smaller amount, such as below the amount threshold, accessing a smaller amount of data, etc.), a lower tier of models (e.g., the basic tier) may be used for processing the transaction. As a result, the service provider system may use models that require a larger amount of computer resources to process transactions that are riskier in nature (since they are on a larger scale), and may use models that require a smaller amount of computer resources to process transactions that are less risky in nature (since they are on a smaller scale). This way, the service provider system may significantly improve the computer resource usage efficiency in processing transactions without sacrificing security, especially when a large portion of the transactions processed by the service provider system are on the smaller scale, and would be processed using only models that require the least amount of computer resources. Furthermore, by using the tier of models that consumer the least amount of computer resources to process transactions that are in smaller scale also enables faster transaction processing and response time for the end users (e.g., consumers, merchants, etc.).

In some embodiments, in addition to dynamically selecting different tiers of models for processing the transactions, the service provider system may also apply various other techniques to further improve computer resource usage efficiency for processing related transactions. It has been contemplated that, with the ease of conducting electronic transactions, users may frequently conduct transactions that are related to each other (e.g., transactions that share one or more common attributes). For example, a user may establish a crowd-funding operation that enables multiple other users to contribute toward a common goal (e.g., transferring funds to a common entity or account). In another example, advancements in mobile computing platforms and mobile applications may enable a group of users to perform bill-splitting at a restaurant, in which each user may pay a corresponding share of a bill to the restaurant owner. As such, in many instances, these related transactions individually be on a smaller scale (e.g., a small amount of fund transfer), but together may form a transaction on a larger scale (e.g., the total amount of crowd funding transactions, the total bill, etc.).

In some embodiments, the service provider system may use one or more techniques, such as batch processing techniques and data caching techniques, to improve the computer resource usage efficiency in processing these related transactions by leveraging the similarities among the related transactions. For example, when related transactions are being conducted within a short time frame (e.g., five minutes, ten minutes, etc.), instead of processing these related transactions individually one at a time, the service provider system may compile the related transactions, and process the related transactions in a batch process. Since the related transactions share one or more common attributes, certain processing of the related transactions may be redundant. For example, when the common attribute includes the same recipient entity (e.g., transactions associated with a crowd-funding operation, transactions associated with a bill-splitting operation, etc.), the same processes for retrieving raw information about the recipient (from one or more internal or external data sources), processing the raw information to generate processed data about the recipient, evaluating the recipient based on the processed data, assessing a risk of the transaction based on the recipient, etc. maybe performed by the service provider system repetitively for each related transaction if the related transactions are processed separately and individually. The repetition of the same processes (redundancy) can be eliminated (e.g., processing only once for all of the related transactions) when the related transactions are processed in a batch instead. As such, when the service provider system receives a request to process a first transaction and determines that one or more transactions related to the first transaction are likely to be conducted within a predetermined time frame (e.g., five minutes, ten minutes, etc.), the service provide system may delay the processing of the first transaction (and any subsequent related transactions (e.g., to the same recipient initiated by devices within a threshold distance of the device associated with the first transaction and for amounts within a certain range of the amount of the first transaction) conducted within the predetermined time frame), until the end of the predetermined time frame, by which time the service provider system may process all of the related transactions conducted within the predetermined time frame (including the first transaction and the subsequent related transactions) together in a batch process.

However, in certain scenarios, the related transactions may not be conducted within the predetermined time frame (e.g., five minutes, ten minutes, etc.) and/or within another metric (e.g., amount and/or distance). For example, a crowd-funding operation may last for hours or even days. The batch processing technique may not work in these scenarios as it would be impractical to delay the processing of transactions for several hours or days. As such, when related transactions are conducted over a period of time that are longer than the predetermined time frame, instead of using a batch processing technique, the service provider system may apply a data caching technique to improve the computer resource usage efficiency for processing the related transactions. In some embodiments, when the service provider system receives a request to process a first transaction and determines that transactions related to the first transaction are likely to be conducted within a period a time that is longer than the predetermined time frame, the service provide system may process the first transaction in a regular manner. In an example of related transactions not being conducted within a distance associated with the first transaction, the service provider system may look at other data to determine a likelihood the first transaction will be related to other transactions outside a time frame, such as the first transaction indicating a history of the user being involved in previous group payment transactions at the location or with the merchant. In such a situation, the service provider system may hold the first transaction for a period of time to account for transactions initiated outside the predetermined time frame, such as other parties leaving in a car and then paying their portions after they have traveled outside the distance range.

While processing the first transaction, the service provider system may obtain data related to a common attribute that is likely to be shared by related transactions conducted in the future, such as the raw information associated with a recipient of the transaction obtained from one or more internal or external sources, processed data obtained from processing the raw information, data related to the evaluating of the recipient and the assessing of the risk of the transaction based on the recipient, etc. Instead of discarding the data after the processing of the first transaction, the service provider system may save the data in a cache memory that will persist across the processing of multiple subsequent related transactions. In some embodiments, in addition to storing the data related to the recipient (which may include one or more of the raw information retrieved from the one or more internal or external sources, the processed data generated based on processing the raw information, the outcomes from evaluating the recipient and assessing the risk of the transaction based on the recipient, etc.), the service provider system may also provide an indication (e.g., a flag), in a memory (e.g., the cache memory or another memory associated with the service provider system) that information related to the recipient is stored in the cache memory. In some embodiments, the indication may be implemented as a flag or an entry in a lookup table. The entry may include an index generated based on the common attribute (e.g., a hash of the recipient entity in the transaction), and one or more values that are related to the common attribute and usable in the processing of any subsequent related transactions.

When the service provider system receives a request to process a second transaction, the service provider system may determine whether the second transaction is related to the first transaction based on the stored indication (e.g., the flag). If the second transaction is unrelated to the first transaction, the service provider system may process the second transaction without accessing the cache memory. However, if the second transaction is related to the first transaction (e.g., having the same recipient as the first transaction), the service provider system may abort the processes related to the recipient, and may instead access the information related to the recipient from the cache memory. The service provider system may process the second transaction based on the information retrieved from the cache memory, and avoid performing the redundant processes as a result. As discussed herein, the cached information may be stored in various entries of a lookup table. Each entry in the lookup table may include a key that is determined based on the common attribute (e.g., an identifier of the recipient, etc.). Thus, in order to access the information related to the recipient, the service provider system may generate a key based on the identifier of the recipient (e.g., hashing the identifier of the recipient, etc.), and may retrieve the cached information in the cache memory based on the key. In some embodiments, the information stored in each entry is also encrypted using an encryption key generated based on the common attribute. This way, information stored in the lookup table remains secured and confidential (e.g., the service provider system will unlikely access wrong cached information by accident).

Since the technique that the service provider system selects for processing a transaction depends on whether and when any related transactions will be conducted, the service provider system of some embodiments may, upon receiving a request to process the transaction (e.g., a first transaction), predicts whether and when other transactions related to the first transaction will be conducted through the service provider system. In some embodiments, the service provider system may use a machine learning model configured to predict a frequency of related transactions based on attributes associated with the first transaction. For example, when the first transaction is an electronic payment transaction, the attributes may include an identity of a sender, an identity of a recipient, a transaction amount, a description for the transaction, a location of a device associated with the sender, a location of a device associated with the recipient, and other data related to the electronic payment transaction.

In some embodiments, the service provider system may also access historical transaction data associated with transactions that have been previously processed by the service provider system. The historical transaction data may be represented as a transaction graph, where each user (or each user account) may be represented by a node, and each transaction conducted between two users (or two user accounts) may be represented by an edge connected to the two corresponding nodes. The historical transaction data may be illustrative of other users who are related to the sender of the first transaction (e.g., users who have conducted related transactions as the sender in the past, etc.). As such, the service provider system may provide the attributes of the first transaction and the historical transaction data as input data to the machine learning model. Based on the input data, the machine learning model may be trained to predict a future frequency of transactions that are related to the first transaction. Based on the predicted frequency, the service provider system may determine to apply the batch processing technique or the cache data technique to improve the computer resource usage efficiency in processing the first transaction and its related transactions.

FIG. 1 illustrates an electronic transaction system 100, within which the service provider system may be implemented according to one embodiment of the disclosure. The electronic transaction system 100 includes a service provider server 130, a merchant server 120, and user devices 110 and 180 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via websites hosted by, or mobile applications associated with, the merchant server 120. The user 140 may also log in to a user account to access account services or conduct electronic transactions (e.g., data access, account transfers or payments, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the merchant server 120 and/or the service provider server 130.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile).

In various implementations, the user 140 is able to input data and information into an input component (e.g., a keyboard) of the user device 110. For example, the user 140 may use the input component to interact with the UI application 112 (e.g., to conduct a purchase transaction with the merchant server 120 and/or the service provider server 130, to initiate a chargeback transaction request, etc.).

The user device 180 may include substantially the same hardware and/or software components as the user device 110, which may be used by a different user to conduct transactions with the merchant server 120 and or the service provider server 130. In some embodiments, the user 140 may also use the user device 110 to conduct transactions with the user of the user device 180.

The merchant server 120, in various embodiments, may be maintained by a business entity (or in some cases, by a partner of a business entity that processes transactions on behalf of business entity). Examples of business entities include merchants, resource information providers, utility providers, online retailers, real estate management providers, social networking platforms, a cryptocurrency brokerage platform, etc., which offer various items for purchase and process payments for the purchases. The merchant server 120 may include a merchant database 124 for identifying available items or services, which may be made available to the user devices 110 and 180 for viewing and purchase by the respective users.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 (or the user of the user device 180) may interact with the marketplace application 122 through the user interface application 112 over the network 160 to search and view various items or services available for purchase in the merchant database 124. The merchant server 120, in one embodiment, may include at least one merchant identifier 126, which may be included as part of the one or more items or services made available for purchase so that, e.g., particular items and/or transactions are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user devices 110 and 180, and the service provider server 130 via the network 160.

The service provider server 130, in one embodiment, may be maintained by a transaction processing entity or an online service provider, which may provide processing of electronic transactions between the users of the user devices 110 and 180 and one or more merchants. As such, the service provider server 130 may include a service application 138, which may be adapted to interact with the user device 110, the user device 180, and/or the merchant server 120 over the network 160 to facilitate the electronic transactions (e.g., electronic payment transactions, data access transactions, etc.) among users and merchants processed by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, between two merchants, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user devices 110 and 180 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140, the user of the user device 180, or a merchant associated with the merchant server 120, etc.) may access a user account associated with the user and access various services offered by the service provider server 130, by generating HTTP requests directed at the service provider server 130.

The service provider server 130, in one embodiment, may be configured to maintain one or more user accounts and merchant accounts in an accounts database 136, each of which may be associated with a profile and may include account information associated with one or more individual users (e.g., the user 140 associated with user device 110, the user associated with the user device 180, etc.) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 also includes a transaction processing module 132 that implements the service provider system as discussed herein. The transaction processing module 132 may be configured to process transactions based on requests received from the user device 110, the user device 180, and/or the merchant server 120 via the interface server 134. In some embodiments, the transaction processing module 132 may dynamically apply one or more techniques that would reduce the amount of computer resources usage required for processing the transactions, and thereby improving the overall computer resource usage efficiency of the service provider server 130.

Figure 2:
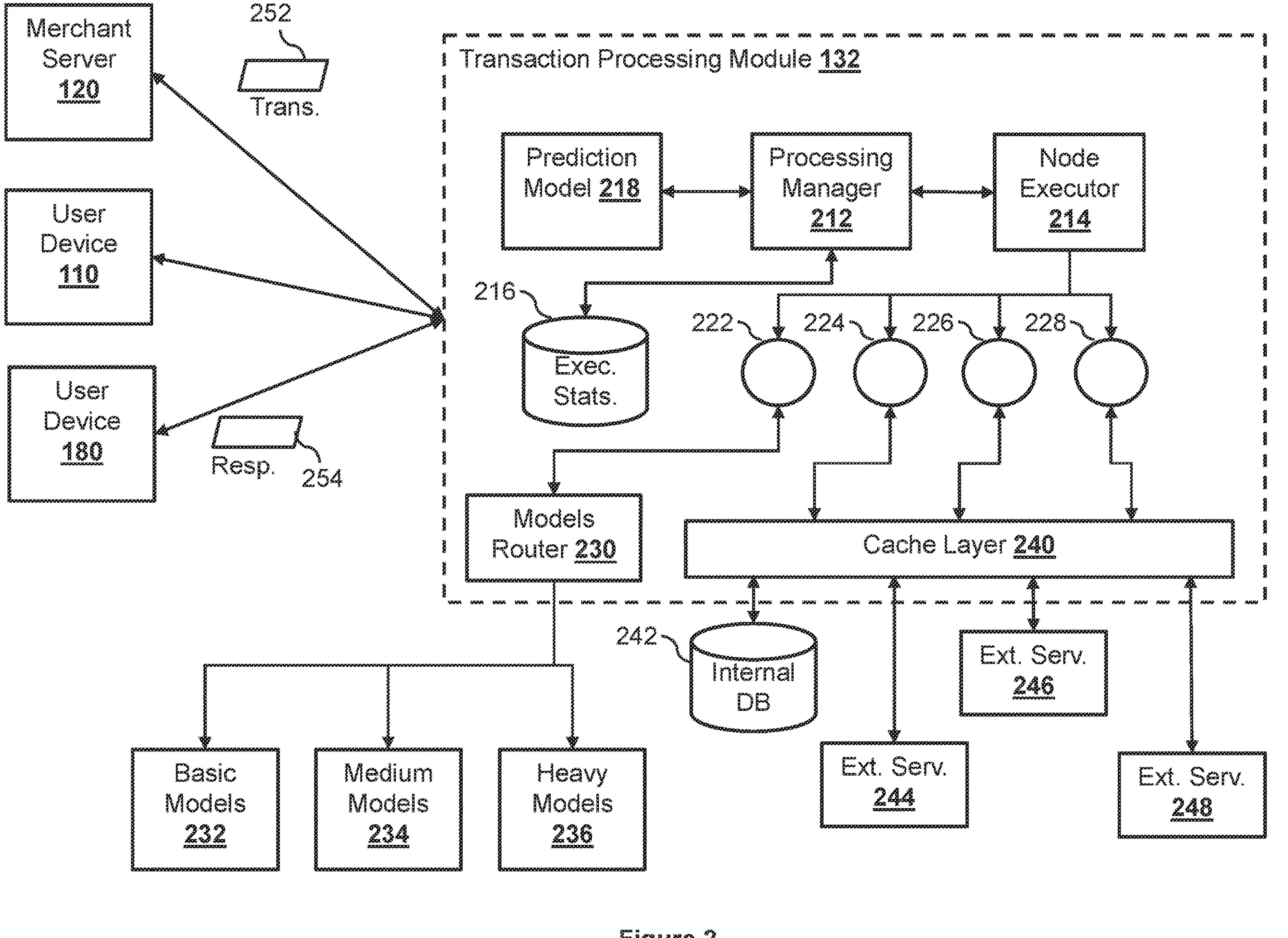
FIG. 2 is a block diagram illustrating the computer modules that implement the framework for improving computer resource usage efficiency according to an embodiment of the present disclosure.

FIG. 2 illustrates the transaction processing module 132 according to various embodiments of the disclosure. The transaction processing module 132 may be configured to process transactions based on transaction requests received from user devices (e.g., the user devices 110 and 180) and/or merchants (e.g., the merchant server 120). As shown, the transaction processing module 132 includes a node executor 214 that is connected with computer nodes 222, 224, 226, and 228. Each of the computer nodes 222, 224, 226, and 228 may correspond to a different device (e.g., a different computer server, etc.) or a different virtual machine. In some embodiments, each of the nodes 222, 224, 226, and 228 may be configured to perform a corresponding task for the processing of transactions. When a transaction request for processing a transaction is received by the transaction processing module 132, the node executor 214 may instruct each of the nodes 222, 224, 226, and 228 to perform the corresponding task. For example, the computer node 224 may be configured to access internal data from an internal database 242 (which may include the accounts database 136) for processing the transaction. The internal data may include attributes associated with a user (e.g., a sender in a payment transaction) who initiated the transaction, such as a transaction history (e.g., a transaction frequency, an average transaction amount, etc.) associated with the sender, a gender of the sender, an age of the sender, an address of the sender, etc., and attributes associated with a recipient in the transaction, such as a transaction history of the recipient, a gender of the recipient, an age of the recipient, an address associated with the recipient, etc. The computer nodes 226 and 228 may be configured to retrieve external data from one or more external servers (e.g., external servers 244, 246, and 248) for processing the transaction. The external data may include credit data associated with the sender and/or the recipient from a credit bureau server, additional information associated with the sender and/or the recipient, such as ownership of companies or properties, associated accounts with another service provider, etc. The computer node 222 may be configured to use one or more computer models for the processing of the transaction. The one or more computer models may include a variety of models (e.g., machine learning models, decision trees, other types of rule-based models, etc.) that are configured to perform different tasks for the processing of the transaction based on the data associated with the transaction, the internal data retrieved from the internal database 242, and/or the external data retrieved from the external servers 244, 246, and 248. For example, the one or more computer models may include one or more models configured to authenticate the user (e.g., the sender of the transaction) who initiated the transaction request, one or more models configured to recommend a funding instrument for use in the transaction, one or more models for evaluating the recipient, one or more models for assessing a fraudulent risk of the transaction, and/or possibly other models.

In order for the transaction processing module 132 to process transactions using the framework as disclosed herein, several additional components may be added to the transaction processing module 132. As shown in FIG. 2, a data storage 216, a prediction model 218, a models router 230, and a cache layer 240 may be added to the transaction processing module 132, such that the transaction processing module 132 may apply one or more techniques to improve the computer resource usage efficiency in processing transactions under the framework.

In some embodiments, the data storage 216 may be configured to store execution statistics associated with transactions that have been processed by the transaction processing module 132. The execution statistics may indicate a frequency of related transactions that have been processed by the transaction processing module 132 in the past and the attributes of those related transactions. For example, a processing manager 212 may monitor the transactions being processed by the transaction processing module 132 and may record the information associated with the processed transactions in the data storage 216.

The prediction model 218 may be configured (e.g., by the processing manager 212, etc.) to predict a frequency of transactions that are related to a given transaction based on attributes associated with the transaction. In some embodiments, the processing manager 212 may use the execution statistics stored in the data storage 216 as training data to train the prediction model 218, such that the prediction model 218 may learn the patterns associated with related transactions that have been processed by the transaction processing module 132 in the past.

The models router 230 may be configured to divide the one or more computer models into different tiers of computer models (e.g., a basic tier of models 232, a medium tier of models 234, and a heavy tier of models 236) based on the required computer resource usage for each of the one or more computer models. The computer resource usage required by each computer model may include an amount of computer processing power required to process the transaction using the computer model, an amount of computer memory required to process the transaction using the computer model, and an amount of data required to be communicated over a network for processing the transaction using the computer model. As such, the computer resource usage for each computer model may be represented as a vector having multiple dimensions (e.g., a dimension corresponding to the computer processing power, a dimension corresponding to memory usage, and a dimension corresponding to computer network usage, etc.).

In some embodiments, the models router 230 may analyze each of the one or more computer models to determine the computer resource usage required by each of the one or more computer models. For example, the models router 230 may simulate the processing of a set of transactions by providing each of the one or more computer models transaction data associated with the set of transactions that have been processed by the transaction processing module 132 in the past. The models router 230 may then monitor the computer resource usage by each of the one or more computer models as the computer model is performing a corresponding task (e.g., authenticating a user, assessing a risk of the transaction, etc.) for processing the transactions. For example, the models router 230 may determine an amount of time taken for the computer model to perform the corresponding task (which may be correlated to an amount of computer processing power used by the computer model in performing the task). The models router 230 may also determine an amount of computer memory used by the computer model to perform the corresponding task and an amount of data transmitted over a network while performing the corresponding task. The models router 230 may then calculate the computer resource usage (e.g., a usage vector) for each of the one or more computer models.

The models router 230 may assign each of the one or more computer models to a tier based on the calculated computer resource usage. For example, when the computer models are divided into three tiers, the models router 230 may assign a computer model to a first tier (e.g., the basic tier of models 232) when the computer resource usage required by the computer model is below a first threshold, may assign the computer model to a second tier (e.g., the medium tier of models 234) when the computer resource usage required by the computer model is above the first threshold but below a second threshold, and may assign the computer model to a third tier (e.g., the heavy tier of models 236) when the computer resource usage required by the computer model is above the second threshold. While the one or more computer models are divided into three different tiers in this example, it has been contemplated that the computer models can be divided into any number of tiers of models depending on the needs of the service provider and/or the characteristics of the transactions being processed by the transaction processing module 132. Based on the division of the computer models, the models router 230 may select different tiers of models for processing different transactions based on the attributes of the transactions. For example, the models router 230 may select the basic tier of models 232 for processing transactions having transaction amounts below a first amount threshold (e.g., $50), may select the medium tier of models 234 for processing transactions having transaction amounts above the first amount threshold but below a second amount threshold (e.g., $500), may select the heavy tier of models 236 for processing transactions having transaction amounts above the second amount threshold.

The cache layer 240 may comprise a high-speed memory chip that is integrated within or outside of a processing unit associated with the transaction processing module 132. The cache layer 240 may provide high-speed data writing and reading capability, but may be limited in memory space. In some embodiments, the cache layer 240 may be configured to store data temporarily to be accessed by the nodes 222, 224, 226, and 228. For example, the processing manager 212 and/or the node executor may determine to store certain data, such as transaction data associated with one or more transactions, internal data retrieved from the internal database 242, and/or external data retrieved from the external servers 244, 246, and 248 based on an output from the prediction model 218.

Using the framework as disclosed herein, as the transaction processing module 132 receives a request for processing a transaction 252, the processing manager 212 may extract transaction data associated with the transaction 252 from the request. The transaction data of the transaction 252 may include data such as an identity of a sender in the transaction 252, an identity of a recipient in the transaction 252, an amount associated with the transaction 252, a funding instrument used for the transaction 252, etc. The processing manager 212 may first determine whether the transaction 252 is part of a pending batch process for processing a group of related transactions. For example, the processing manager 212 may determine if any pending batch processes exist within the transaction processing module 132, and if so, may determine if the transaction 252 is associated with any of the pending batch processes (e.g., if the transaction 252 is related to, such as sharing one or more attributes with, other transactions associated with a batch process). If the transaction 252 is associated with a pending batch process, the processing manager 212 may suspend (e.g., delay) the processing of the transaction 252, and may store the transaction data associated with the transaction 252 along with the other transactions associated with the pending batch process (e.g., in the cache layer 240), such that the transaction 252 may be processed along with the other transactions together in the batch process, at a future time specified by the batch process.

If the transaction 252 is not associated with any existing pending batch processes, the processing manager 212 may determine if the transaction 252 is associated with a new batch process. In this regard, the processing manager 212 may use the prediction model 218 to predict a frequency of future transactions that are related to the transaction 252. Transactions are related to the transaction 252 when the transactions share one or more attributes (e.g., the same recipient, etc.) with the transaction 252. For example, the processing manager 212 may provide the transaction data associated with the transaction 252 to the prediction model 218. In some embodiments, the processing manager 212 may also provide historic transaction data (e.g., a transaction graph or a portion thereof) as additional input data to the prediction model 218. The prediction model 218 may be configured and trained (using the execution statistics stored in the data storage 216) to generate a frequency prediction of future transactions related to the transaction 252 (e.g., 100 transactions per minute, 0.1 transaction per minute, etc.).

Based on the output from the prediction model 218, the processing manager 212 may determine whether to initiate a new batch process based on the transaction 252. For example, the processing manager 212 may determine an expected number of transactions related to the transaction 252 within a predetermined time frame (e.g., within the next minute, within the next five minutes, etc.) based on the frequency output. When the expected number of related transactions within the predetermined time frame exceeds a threshold number (e.g., five, fifteen, thirty, etc.), the processing manager 212 may initiate a new batch process based on the transaction 252. The processing manager 212 may suspend (e.g., delay) the processing of the transaction 252, and may process the transaction 252 and the related transactions together as a batch at a future time (e.g., at the end of the predetermined time frame, etc.). Processing the related transactions may improve the computer resource usage efficiency because certain redundant processes that are performed for each of the transactions, if the transactions are processed separately and individually, may be eliminated. For example, if all of the related transactions have the same recipient, any processes related to the recipient (e.g., retrieving attributes or other information associated with the recipient, processing raw information associated with the recipient, etc.) may be performed only once for all of the related transactions when the related transactions are processed together in a batch process.

If no batch processes are initiated for the transaction 252, the processing manager 212 may process the transaction 252 without any delay. The processing manager may determine whether any data stored in the cache layer 240 is related to the transaction 252. For example, the processing manager 212 may access a lookup table (e.g., a hash table) based on the transaction data associated with the transaction 252 (e.g., the identity of the sender, the identity of the recipient, etc.). If there exists data stored in the cache layer 240 that is related to the transaction 252 (e.g., raw information or processed data associated with the recipient of the transaction 252, etc.), the node executor 214 may instruct one or more of the nodes 224, 226, and/or 228 to abort performing at least some of the data retrieval and/or data preparation processes for the transaction 252, and may instead use the data from the cache layer 240 to process the transaction 252.

If no data stored in the cache layer 240 is related to the transaction 252, the node executor 214 may instruct each of the nodes 222, 224, 226, and 228 to perform the corresponding processes. For example, the node executor 214 may instruct the node 224 to retrieve internal data associated with the transaction 252 from the internal database 242. The node executor 214 may also instruct the nodes 226 and 228 to retrieve external data associated with the transaction 252 from the external servers 244, 246, and 248. In some embodiments, the nodes 224, 226, and 228 may also be configured to process the data retrieved from the internal database 242 and/or the external servers 244, 246, and 248. After retrieving (and processing) the internal data and the external data, the processing manager 212 may determine whether any of the data should be stored in the cache layer 240 for processing future related transactions.

Since the cache memory in the cache 240 is limited, it is not possible to store all of the data retrieved from the internal database 242 and the external servers 244, 246, and 248. Furthermore, the data may become outdated after a period of time (e.g., information about a user may be updated), and may no longer be used by the transaction processing module 132 to accurately process transactions. As such, the processing manager 212 may determine to store the data retrieved from the internal database 242 and the external servers 244, 246, and 248 in the cache layer 240 if there is a high likelihood that the data will be used for processing future transactions. In some embodiments, the processing manager 212 may rely on the output generated by the prediction model 218. For example, the processing manager 212 may determine to store the data in the cache layer 240 when the predicted frequency of future related transactions is above a threshold frequency. If the predicted frequency is above the threshold frequency, the processing manager 212 may store the retrieved data and/or processed data in the cache layer 240. The processing manager 212 may also add an entry in the lookup data in association with the identity of the recipient, such that future related transactions (e.g., transactions having the same recipient) can retrieve the data related to the recipient directly from the cache layer 240.

Since the memory capacity in the cache layer 240 is limited, in some embodiments, the processing manager 212 may remove data stored in the cache layer 240 based on one or more triggers. The trigger may include an expiration time since the data was first stored in the cache layer 240, an actual frequency of related transactions that use data stored in the cache layer 240 falling below a threshold frequency, or other conditions. Upon detecting the trigger, the processing manager 212 may remove the data from the cache layer 240, and may delete the corresponding entry within the lookup table, so that the memory space in the cache layer 240 may become available for storing data associated with other transactions.

In some embodiments, the node executor 214 may instruct the node 222 to use one or more computer models to process the transaction 252 based on the data retrieved and processed by the nodes 224, 226, and 228. When the transaction 252 is processed by the transaction processing module 132 using the framework as disclosed herein, instead of using all of the models available to the transaction processing module 132, the models router 230 may select only a subset of models (e.g., a tier of models) for use in processing the transaction 252 based on attributes associated with the transaction 252. For example, when the models available for use by the transaction processing module 132 are divided into three tiers of models (e.g., the basic tier of models 232, the medium tier of models 234, and the heavy tier of models 236), the models router 230 may select one of the tiers of models for processing the transaction 252. In a non-limiting example, the models router 230 may select a tier of models for processing the transaction 252 based on an amount associated with the transaction 252. When the amount is less than a first threshold, the models router 230 may select the basic tier of models 232 for processing the transaction 252. When the amount is above a first threshold but less than a second threshold, the models router 230 may select the medium tier of models 234 for processing the transaction 252. When the amount exceeds the second threshold, the models router 230 may select the heavy tier of models 236 for processing the transaction 252. The node 222 may then process the transaction 252 using the tier of models selected by the models router 230.

In some embodiments, based on the outputs from the models, the node 222 may determine whether to authorize, deny, or further process (such as requesting additional authentication or security information) the transaction 252. For example, if a model determines that the risk associated with the transaction 252 exceeds a risk level, the node 222 may determine to deny the transaction 252. On the other hand, if the outputs from all of the models used by the node 222 (selected by the models router 230) are acceptable based on a set of criteria determined by the transaction processing module 132, the node 222 may determine to authorize the transaction 252. The processing manager 212 may then perform a series of processes to resolve the transaction 252 (e.g., through validation, delivery, and settlement, etc.).

After processing the transaction 252, the processing manager 212 may generate a response 254, and transmit the response 254 to a device (e.g., the device that initiated the transaction 252). The response 254 may indicate whether the transaction has been completed or denied.

Figure 3:
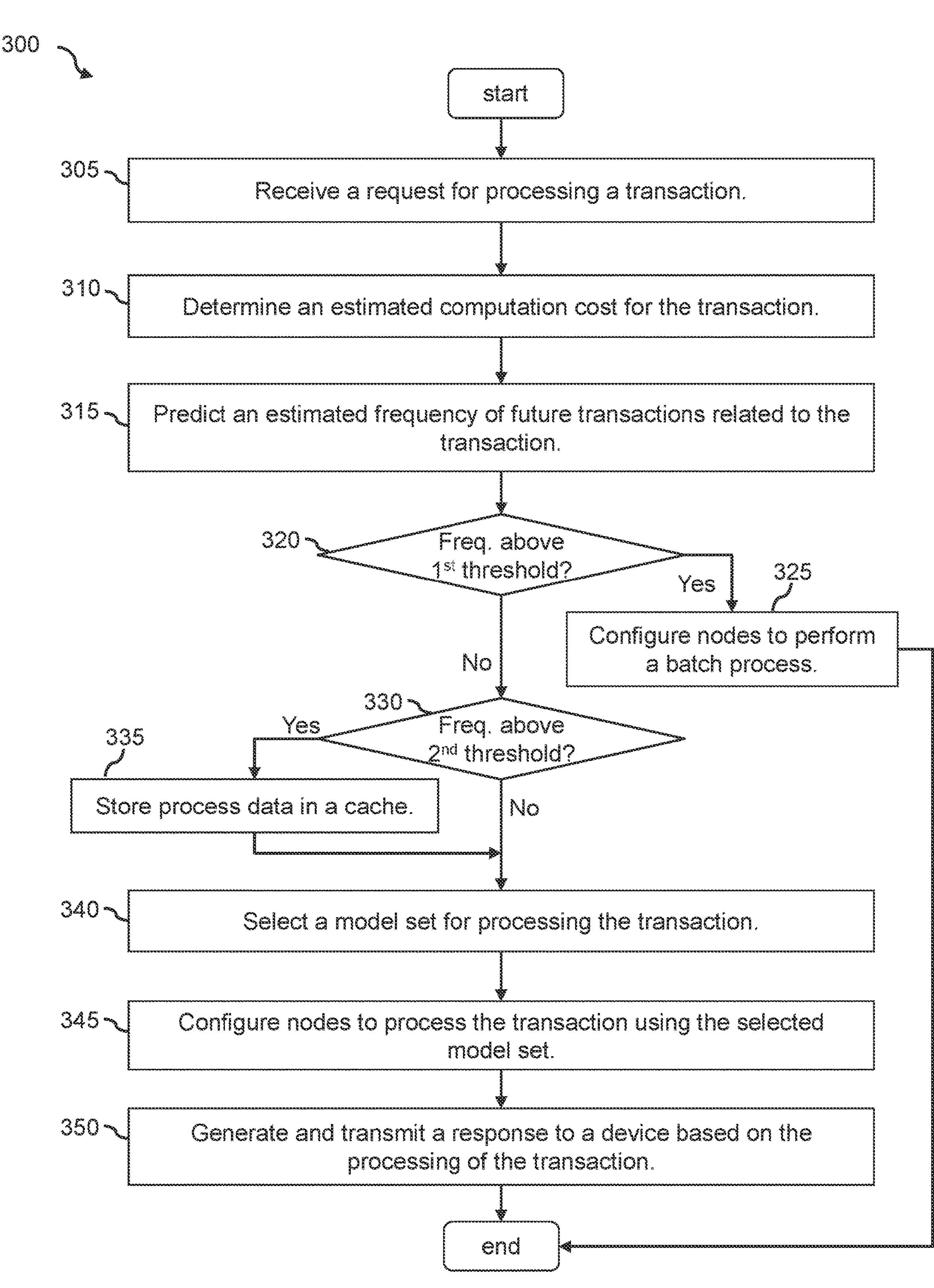
FIG. 3 illustrates an example flow for processing transactions according to an embodiment of the present disclosure.

FIG. 3 illustrates a process 300 for applying one or more techniques to improve the computer resource usage efficiency in processing transactions according to various embodiments of the disclosure. In some embodiments, at least a portion of the process 300 may be performed by the transaction processing module 132. The process 300 begins by receiving (at step 305) a request for processing a transaction. For example, the transaction processing module 132 may receive a transaction request from the merchant server 120, the user device 110, and/or the user device 180. The transaction may correspond to a data access request, a payment request, or any type of requests.

The process 300 then determines (at step 310) an estimated computation cost for the transaction. For example, the transaction processing module 132 may extract attributes associated with the transaction, such as a type of transaction, an amount associated with the transaction, a funding instrument used for the transaction, identities of the parties involved in the transaction, etc. The transaction processing module 132 may then estimate a computation cost for processing the transaction based on the attributes. As discussed herein, the computation cost may include the amount of computer processing capacity required for processing the transaction, the amount of computer memory required for processing the transaction, the amount of data required to be transmitted over a network for processing the transaction, etc. For example, the transaction processing module 132 may compare the transaction at issue with similar transactions that have been previously processed by the transaction processing module 132, and may estimate the computation cost based on the computation costs associated with similar transactions previously processed by the transaction processing module 132. In some embodiments, the transaction processing module 132 may determine to apply one or more techniques to reduce the computation cost for processing the transaction only when the computation cost exceeds a threshold. In some embodiments, when the estimated computation cost for processing the transaction exceeds the threshold, the transaction processing module 132 may dynamically apply one or more techniques to reduce the computation cost, as discussed herein.

In order to determine which techniques to apply for processing the transaction, the process 300 predicts (at step 315) an estimated frequency of future transactions related to the transaction. As discussed herein and in one embodiment, transactions are determined to be related with each other when they share one or more attributes (e.g., having the same recipient, access the same datasets from a database, etc.). Depending on the shared one or more attributes, additional attributes may be needed before determining related transactions. In other words, there may be some factors that carry more weight in indicating a related transaction, such as a same recipient and past history of shared transactions. In some embodiments, the transaction processing module 132 may use a prediction model 218 (which can be a machine learning model, such as an artificial neural network) to predict a frequency of future transactions that are related to the transaction being processed by the transaction processing module 132. The transaction processing module 132 may then apply different techniques in processing the transaction, to improve the computer resource usage efficiency of processing the transaction and other related transactions.

The process 300 determines (at step 320) if the frequency is above a first threshold, and configures (at step 325) nodes to perform a batch process if the frequency is above the first threshold. For example, if the frequency output generated by the prediction model 218 is above the first threshold, the processing manager 212 and/or the node executor 214 may cause the computer nodes 222, 224, 226, and 228 to suspend (e.g., delay) the processing of the transaction. In some embodiments, the processing manager 212 may initiate a batch process for transactions that are related to the transaction (e.g., having the same recipient as the transaction), such that the processing of any future transactions that are related to the transaction are also suspended until a time to perform a batch process on all of the related transactions (e.g., at the end of a predetermined time frame).

On the other hand, if the frequency is not above the first threshold, the process 300 determines (at step 330) if the frequency is above a second threshold, and stores (at step 335) process data in a cache if the frequency is above the second threshold. For example, if the frequency output generated by the prediction model 218 is above the second threshold (which may be smaller than the first threshold), the node executor 214 may instructs the computer nodes 222, 224, 226, and 228 to perform the processing of the transaction. During the processing of the transaction, data may be retrieved (e.g., from the internal database 242, from the external servers 244, 246, and/or 248, etc.) and processed. The node executor 214 may store the retrieved and/or processed data in the cache layer 240, such that the data can be used for processing one or more subsequent transactions that are related to the transaction. By making the data available in the cache layer 240, certain steps for processing the subsequent related transactions can be eliminated.

The process 300 then selects (at step 340) a model set for processing the transaction and configures (at step 345) nodes to process the transaction using the selected model set. For example, the models router 230 may divide the computer models that are available for use in processing the transaction into multiple tiers (e.g., the basic tier 232, the medium tier 234, and the heavy tier 236) according to the computer resources required by each of the models for processing transactions. The models router 230 may be configured to select one of the tiers of models for processing the transaction based on an attribute associated with the transaction. For example, the models router 230 may select the basic tier of models 232 to process the transaction when the amount associated with the transaction is below a first amount threshold. The models router 230 may select the medium tier of models 234 to process the transaction when the amount associated with the transaction is above the first amount threshold, but below a second amount threshold. The models router 230 may select the heavy tier of models 236 to process the transaction when the amount associated with the transaction is above the second amount threshold. The node executor 214 may instruct the computer node 222 to process the transaction using the selected tier of models based on the data retrieved and/or processed by the computer nodes 224, 226, and 228.

The process 300 generates and transmits (at step 350) a response to a device based on the process of the transaction. For example, based on the outputs from the models used by the computer node 222, the computer node 222 may determine whether to authorize or process the transaction. If the computer node 222 determines to process the transaction, the transaction processing module 132 may complete the processing of the transaction (e.g., resolving a payment transaction through validation, delivery, and settlement, fulfilling a data access request by providing the requested data, etc.). The transaction processing module 132 may generate a response (which may indicate whether the transaction is completed, denied, or requiring additional processing), and may transmit the response to a device.

Figure 4:
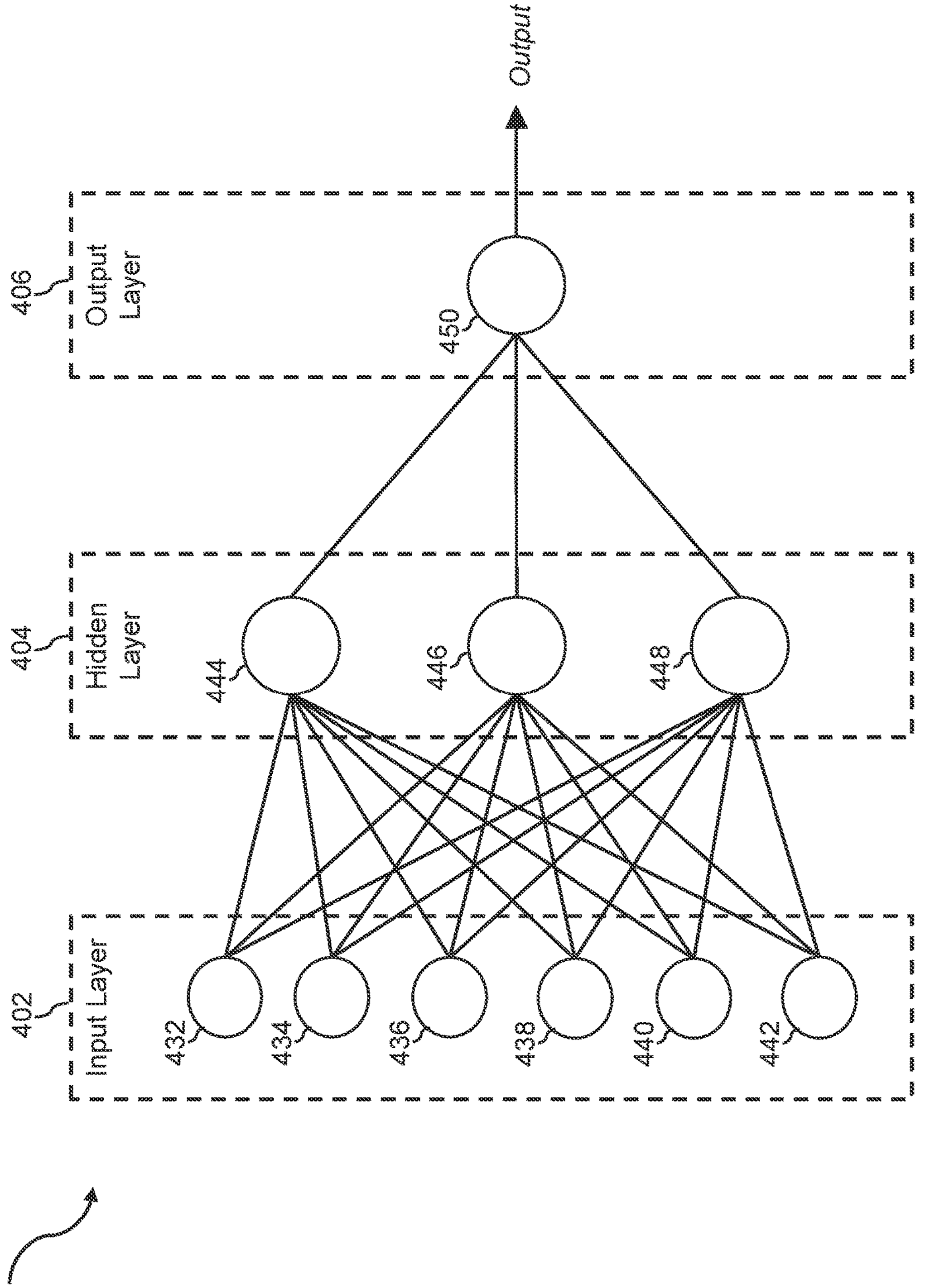
FIG. 4 illustrates an example neural network that can be used to implement a machine learning model according to an embodiment of the present disclosure.

FIG. 4 illustrates an example artificial neural network 400 that may be used to implement a machine learning model, such as the prediction model 218 and at least some of the models included in the basic tier of models 232, the medium tier of models 234, and the heavy tier of models 236. As shown, the artificial neural network 500 includes three layers—an input layer 402, a hidden layer 404, and an output layer 406. Each of the layers 402, 404, and 406 may include one or more nodes (also referred to as "neurons"). For example, the input layer 402 includes nodes 432, 434, 436, 438, 440, and 442, the hidden layer 404 includes nodes 444, 446, and 448, and the output layer 406 includes a node 450. In this example, each node in a layer is connected to every node in an adjacent layer via edges and an adjustable weight is often associated with each edge. For example, the node 432 in the input layer 402 is connected to all of the nodes 444, 446, and 448 in the hidden layer 404. Similarly, the node 444 in the hidden layer is connected to all of the nodes 432, 434, 436, 438, 440, and 442 in the input layer 402 and the node 450 in the output layer 406. While each node in each layer in this example is fully connected to the nodes in the adjacent layer(s) for illustrative purpose only, it has been contemplated that the nodes in different layers can be connected according to any other neural network topologies as needed for the purpose of performing a corresponding task.

The hidden layer 404 is an intermediate layer between the input layer 402 and the output layer 406 of the artificial neural network 400. Although only one hidden layer is shown for the artificial neural network 400 for illustrative purpose only, it has been contemplated that the artificial neural network 400 used to implement any one of the computer-based models may include as many hidden layers as necessary. The hidden layer 404 is configured to extract and transform the input data received from the input layer 402 through a series of weighted computations and activation functions.

In this example, the artificial neural network 400 receives a set of inputs and produces an output. Each node in the input layer 402 may correspond to a distinct input. For example, when the artificial neural network 400 is used to implement the prediction model 218, each node in the input layer 402 may correspond to an attribute associated with a transaction and/or data associated with historical transactions In some embodiments, each of the nodes 444, 446, and 448 in the hidden layer 404 generates a representation, which may include a mathematical computation (or algorithm) that produces a value based on the input values received from the nodes 432, 434, 436, 438, 440, and 442. The mathematical computation may include assigning different weights (e.g., node weights, edge weights, etc.) to each of the data values received from the nodes 432, 434, 436, 438, 440, and 442, performing a weighted sum of the inputs according to the weights assigned to each connection (e.g., each edge), and then applying an activation function associated with the respective node (or neuron) to the result. The nodes 444, 446, and 448 may include different algorithms (e.g., different activation functions) and/or different weights assigned to the data variables from the nodes 432, 434, 436, 438, 440, and 442 such that each of the nodes 444, 446, and 448 may produce a different value based on the same input values received from the nodes 432, 434, 436, 438, 440, and 442. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 402 is transformed into rather different values indicative data characteristics corresponding to a task that the artificial neural network 400 has been designed to perform.

In some embodiments, the weights that are initially assigned to the input values for each of the nodes 444, 446, and 448 may be randomly generated (e.g., using a computer randomizer). The values generated by the nodes 444, 446, and 448 may be used by the node 450 in the output layer 406 to produce an output value (e.g., a prediction) for the artificial neural network 400. The number of nodes in the output layer depends on the nature of the task being addressed. For example, in a binary classification problem, the output layer may consist of a single node representing the probability of belonging to one class (as in the example shown in FIG. 4). In a multi-class classification problem, the output layer may have multiple nodes, each representing the probability of belonging to a specific class.

In some embodiments, the artificial neural network 400 may be implemented on one or more hardware processors, such as CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware XXX60 used to implement the neural network structure is specifically configured based on factors such as the complexity of the neural network, the scale of the tasks (e.g., training time, input data scale, size of training dataset, etc.), and the desired performance.

The artificial neural network 400 may be trained by using training data based on one or more loss functions and one or more hyperparameters. By using the training data to iteratively train the artificial neural network 400 through a feedback mechanism (e.g., comparing an output from the artificial neural network 400 against an expected output, which is also known as the "ground-truth" or "label"), the parameters (e.g., the weights, bias parameters, coefficients in the activation functions, etc.) of the artificial neural network 400 may be adjusted to achieve an objective according to the one or more loss functions and based on the one or more hyperparameters such that an optimal output is produced in the output layer 406 to minimize the loss in the loss functions. Given the loss, the negative gradient of the loss function is computed with respect to each weight of each layer individually. Such negative gradient is computed one layer at a time, iteratively backward from the last layer (e.g., the output layer 406 to the input layer 402 of the artificial neural network 400). These gradients quantify the sensitivity of the network's output to changes in the parameters. The chain rule of calculus is applied to efficiently calculate these gradients by propagating the gradients backward from the output layer 406 to the input layer 402.

Parameters of the artificial neural network 400 are updated backwardly from the last layer to the input layer (backpropagating) based on the computed negative gradient using an optimization algorithm to minimize the loss. The backpropagation from the last layer (e.g., the output layer 406) to the input layer 402 may be conducted for a number of training samples in a number of iterative training epochs. In this way, parameters of the artificial neural network 400 may be gradually updated in a direction to result in a lesser or minimized loss, indicating the artificial neural network 400 has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as to predict a frequency of future related transactions.

Figure 5:
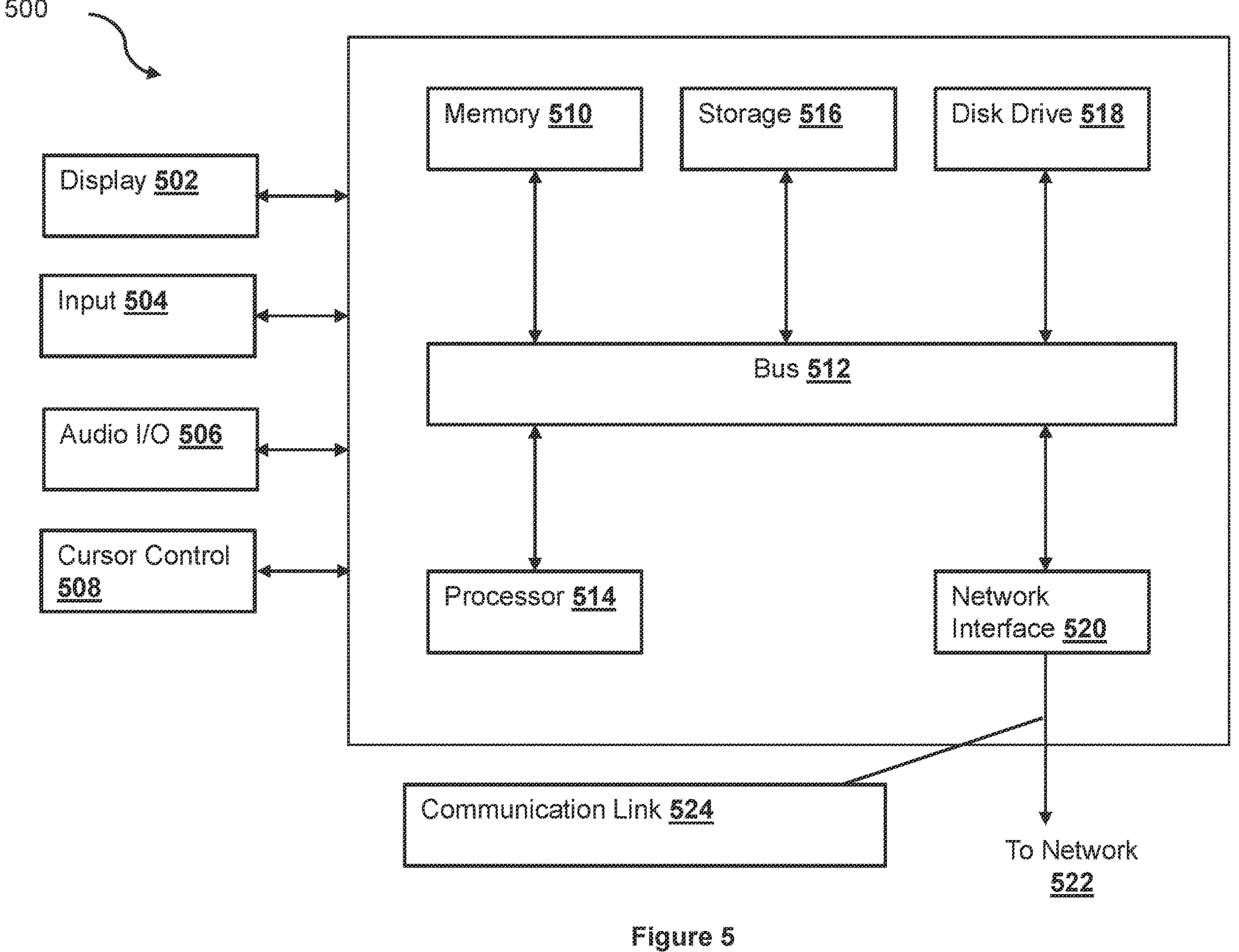
FIG. 5 is a block diagram of a system for implementing a device according to an embodiment of the present disclosure.

FIG. 5 is a block diagram of a computer system 500 suitable for implementing one or more embodiments of the present disclosure, including the service provider server 130, the merchant server 120, the user device 180, and the user device 110. In various implementations, each of the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, 130, and 180 may be implemented as the computer system 500 in a manner as follows.

The computer system 500 includes a bus 512 or other communication mechanism for communicating information data, signals, and information between various components of the computer system 500. The components include an input/output (I/O) component 504 that processes a user (i.e., sender, recipient, service provider) action, such as selecting keys from a keypad/keyboard, selecting one or more buttons or links, etc., and sends a corresponding signal to the bus 512. The I/O component 504 may also include an output component, such as a display 502 and a cursor control 508 (such as a keyboard, keypad, mouse, etc.). The display 502 may be configured to present a login page for logging into a user account or a checkout page for purchasing an item from a merchant. An optional audio input/output component 506 may also be included to allow a user to use voice for inputting information by converting audio signals. The audio I/O component 506 may allow the user to hear audio. A transceiver or network interface 520 transmits and receives signals between the computer system 500 and other devices, such as another user device, a merchant server, or a service provider server via a network 522. In one embodiment, the transmission is wireless, although other transmission mediums and methods may also be suitable. A processor 514, which can be a micro-controller, digital signal processor (DSP), or other processing component, processes these various signals, such as for display on the computer system 500 or transmission to other devices via a communication link 524. The processor 514 may also control transmission of information, such as cookies or IP addresses, to other devices.

The components of the computer system 500 also include a system memory component 510 (e.g., RAM), a static storage component 516 (e.g., ROM), and/or a disk drive 518 (e.g., a solid-state drive, a hard drive). The computer system 500 performs specific operations by the processor 514 and other components by executing one or more sequences of instructions contained in the system memory component 510. For example, the processor 514 can perform the transaction processing functionalities described herein, for example, according to the process 300.

Logic may be encoded in a computer readable medium, which may refer to any medium that participates in providing instructions to the processor 514 for execution. Such a medium may take many forms, including but not limited to, non-volatile media, volatile media, and transmission media. In various implementations, non-volatile media includes optical or magnetic disks, volatile media includes dynamic memory, such as the system memory component 510, and transmission media includes coaxial cables, copper wire, and fiber optics, including wires that comprise the bus 512. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 500. In various other embodiments of the present disclosure, a plurality of computer systems 500 coupled by the communication link 524 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:

a non-transitory memory; and one or more hardware processors coupled with the non-transitory memory and configured to read instructions from the non-transitory memory to cause the system to perform operations comprising:

receiving, from a user device, a request for processing an electronic transaction;

determining, based on at least one of (i) attributes associated with the electronic transaction or (ii) attributes associated with the user device, an estimated computation cost for the processing the electronic transaction;

predicting, using a machine learning model, an estimated frequency of future transactions to be processed by the system that have at least one common attribute with the electronic transaction;

in response to determining that the estimated frequency is above a threshold, selecting, from a plurality of computer models usable for the processing the electronic transaction, a particular computer model for the processing the electronic transaction, wherein different computer models in the plurality of computer models have different internal structure complexities;

configuring one or more computer nodes to use the particular computer model in the processing the electronic transaction, wherein using the particular computer model in the processing the electronic transaction reduces the estimated computation cost for the processing the electronic transaction; and instructing the one or more configured computer nodes to process the electronic transaction.

2. The system of claim 1, wherein the electronic transaction is a first transaction, and wherein the operations further comprise:

determining that the estimated frequency is above a second threshold;

suspending the processing of the first transaction;

subsequent to the suspending the processing of the first transaction, receiving a second request for processing a second transaction from a second user device;

determining that the second transaction shares the at least one common attribute with the first transaction;

further configuring the one or more configured computer nodes to perform a batch processing based on the first transaction and the second transaction; and performing the batch processing using the one or more further configured computer nodes based on the first transaction and the second transaction.

3. The system of claim 1, wherein the operations further comprise:

determining that the estimated frequency is below a second threshold; and storing processed data associated with the processing of the electronic transaction in a cache memory of the system.

4. The system of claim 3, wherein the electronic transaction is a first transaction, and wherein the operations further comprise:

receiving a second request for processing a second transaction from a second user device;

determining that the second transaction shares the at least one common attribute with the first transaction;

further configuring the one or more configured computer nodes to use the processed data associated with the first transaction to process the second transaction; and processing, using the one or more further configured computer nodes, the second transaction based on the processed data retrieved from the cache memory.

5. The system of claim 4, wherein the processed data is obtained based on the one or more further configured computer nodes (i) retrieving first external data from one or more external data sources based on first attributes associated with the first transaction and (ii) processing the first external data, and wherein the further configuring the one or more configured computer nodes to use the processed data to process the second transaction comprises further configuring the one or more configured computer nodes to abort retrieving second external data from the one or more external data sources based on second attributes associated with the second transaction.

6. The system of claim 4, wherein the operations further comprise:

associating a flag with the at least one common attribute, wherein the determining that the second transaction shares the at least one common attribute with the first transaction is based on the flag.

7. The system of claim 3, wherein the operations further comprise:

detecting a trigger associated with the electronic transaction; and in response to detecting the trigger, removing the processed data from the cache memory.

8. The system of claim 7, wherein the trigger is related to at least one of an actual frequency of transactions sharing the at least one common attribute with the electronic transaction, a data type associated with the processed data, a volume of cached data stored in the cache memory, or a priority of the processed data.

9. A method comprising:

receiving, by a computer system and from a user device, a request for processing an electronic transaction;

predicting, using a machine learning model, an estimated frequency of future transactions to be processed by the computer system that have at least one common attribute with the electronic transaction;

in response to determining that the estimated frequency is above a first threshold, selecting, from a plurality of computer models usable for the processing the electronic transaction, a first computer model for the processing the electronic transaction;

configuring, by the computer system, one or more computer nodes to use the first computer model in the processing the electronic transaction, wherein using the first computer model in the processing the electronic transaction provides a higher computer resource usage efficiency for the processing the electronic transaction than a second computer model of the plurality of computer models; and instructing, by the computer system, the one or more configured computer nodes to process the electronic transaction.

10. The method of claim 9, wherein the first computer model is less complex than the second computer model.

11. The method of claim 9, further comprising:

determining that a risk associated with the electronic transaction is below a threshold, wherein the first computer model is selected from the plurality of computer models based on the risk associated with the electronic transaction being below the threshold, and wherein the first computer model requires less computation resources than the second computer model in the plurality of computer models.

12. The method of claim 9, further comprising:

prior to receiving the request, monitoring computer resource usages associated with processing a plurality of transactions; and training the machine learning model using the monitored computer resource usages.

13. The method of claim 9, further comprising:

in response to determining that the estimated frequency is above a second threshold, suspending the processing of the electronic transaction.

14. The method of claim 13, wherein the electronic transaction is a first transaction, and wherein the method further comprises:

subsequent to the suspending the processing of the first transaction, receiving a second request for processing a second transaction from a second user device;

determining that the second transaction shares the at least one common attribute with the first transaction; and further configuring the one or more configured computer nodes to perform a batch processing based on the first transaction and the second transaction.

15. The method of claim 9, further comprising storing processed data associated with the processing the electronic transaction in a cache memory of the computer system.

16. A non-transitory machine-readable medium having stored thereon machine-readable instructions executable to cause a machine to perform operations comprising:

receiving, from a user device, a request for processing an electronic transaction;

determining, based on at least one of (i) attributes associated with the electronic transaction or (ii) attributes associated with the user device, an estimated computation resource usage for the processing the electronic transaction;

predicting, using a machine learning model, an estimated frequency of future transactions to be processed by a service provider associated with the machine that have at least one common attribute with the electronic transaction;

in response to determining that the estimated computation resource usage is above a threshold, selecting, from a plurality of computer modules usable for the processing the electronic transaction, a particular computer module for the processing the electronic transaction;

configuring one or more computer nodes to use the particular computer module in the processing the electronic transaction; and instructing the configured one or more computer nodes to process the electronic transaction.

17. The non-transitory machine-readable medium of claim 16, wherein the operations further comprise suspending the processing of the electronic transaction.

18. The non-transitory machine-readable medium of claim 17, wherein the electronic transaction is a first transaction, and wherein the operations further comprise:

subsequent to the suspending the processing of the first transaction, receiving a second request for processing a second transaction from a second user device;

determining that the second transaction shares the at least one common attribute with the first transaction;

further configuring the one or more configured computer nodes to perform a batch processing based on the first transaction and the second transaction; and performing the batch processing using the one or more further configured computer nodes.

19. The non-transitory machine-readable medium of claim 16, wherein the operations further comprise storing processed data associated with the processing of the electronic transaction in a cache memory of the service provider.

20. The non-transitory machine-readable medium of claim 19, wherein the electronic transaction is a first transaction, wherein the processing the first transaction comprises retrieving first external data from one or more external data sources based on first attributes associated with the first transaction, and wherein the operations further comprise:

receiving a second request for processing a second transaction from a second user device;

determining that the second transaction shares the at least one common attribute with the first transaction; and further configuring the one or more configured computer nodes to (i) abort retrieving second external data from the one or more external data sources based on second attributes associated with the second transaction and (ii) use the processed data stored in the cache memory and associated with the first transaction to process the second transaction.

* * * * *